No. 632,144. Patented Aug. 29, 1899.
A. PELOUX.
ELECTRIC METER.
(Application filed Dec. 16, 1898.)
(No Model.) 3 Sheets—Sheet 1.
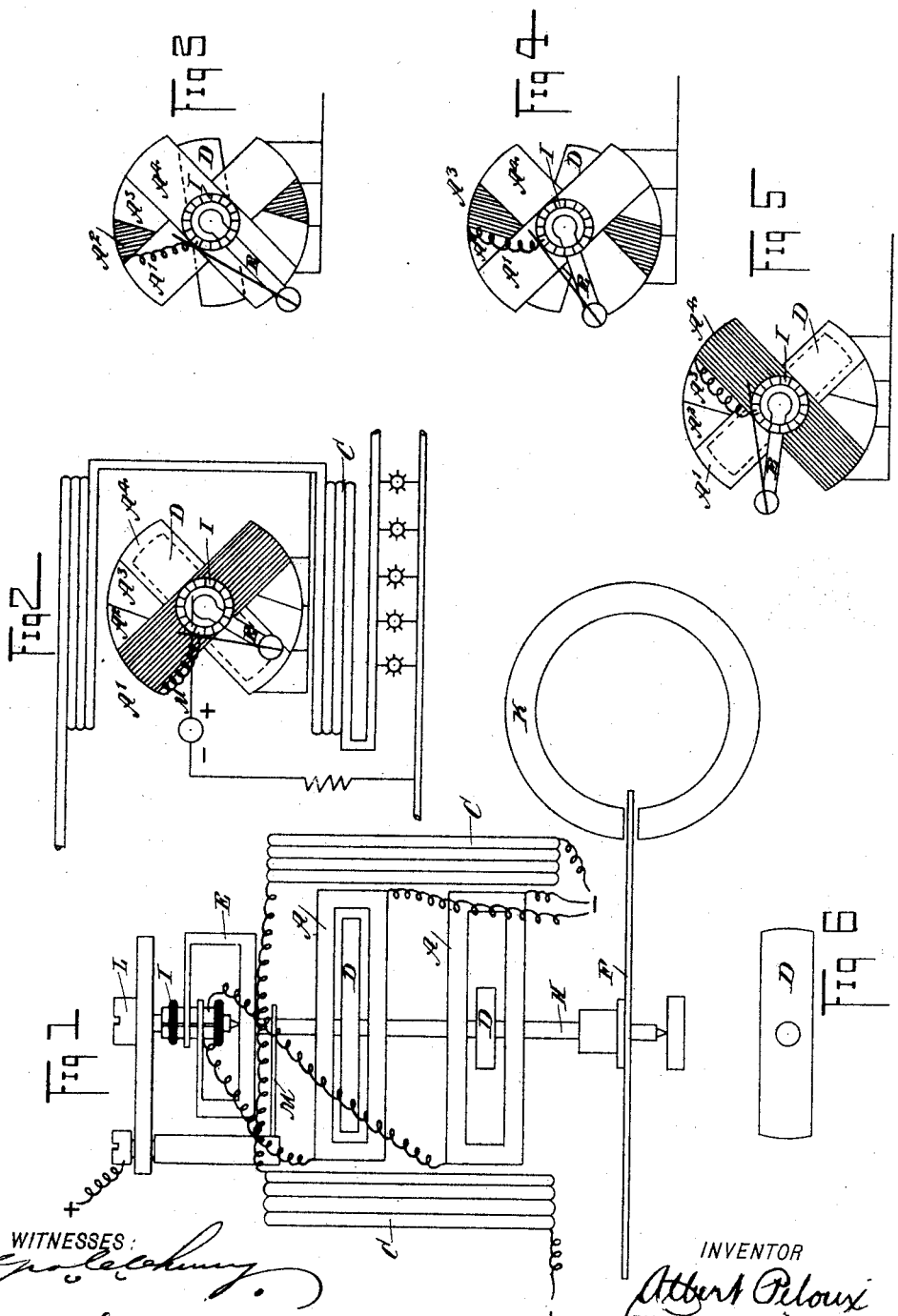
WITNESSES
INVENTOR
Albert Peloux
BY
ATTORNEYS.

No. 632,144. Patented Aug. 29, 1899.
A. PELOUX.
ELECTRIC METER.
(Application filed Dec. 16, 1898.)
(No Model.) 3 Sheets—Sheet 2.
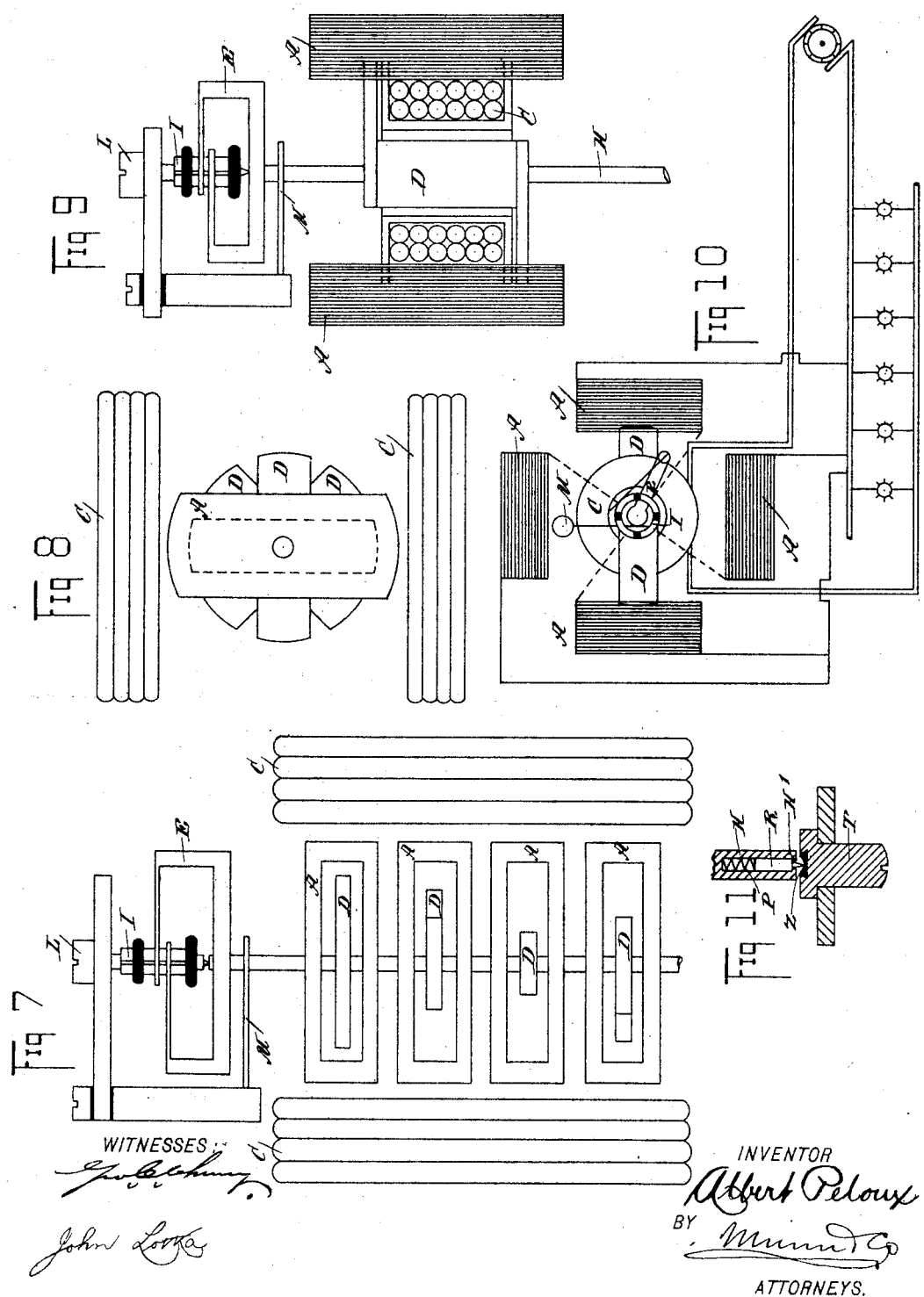
WITNESSES
INVENTOR
Albert Peloux
BY
ATTORNEYS.

No. 632,144. Patented Aug. 29, 1899.
A. PELOUX.
ELECTRIC METER.
(Application filed Dec. 16, 1898.)
(No Model.) 3 Sheets—Sheet 3.
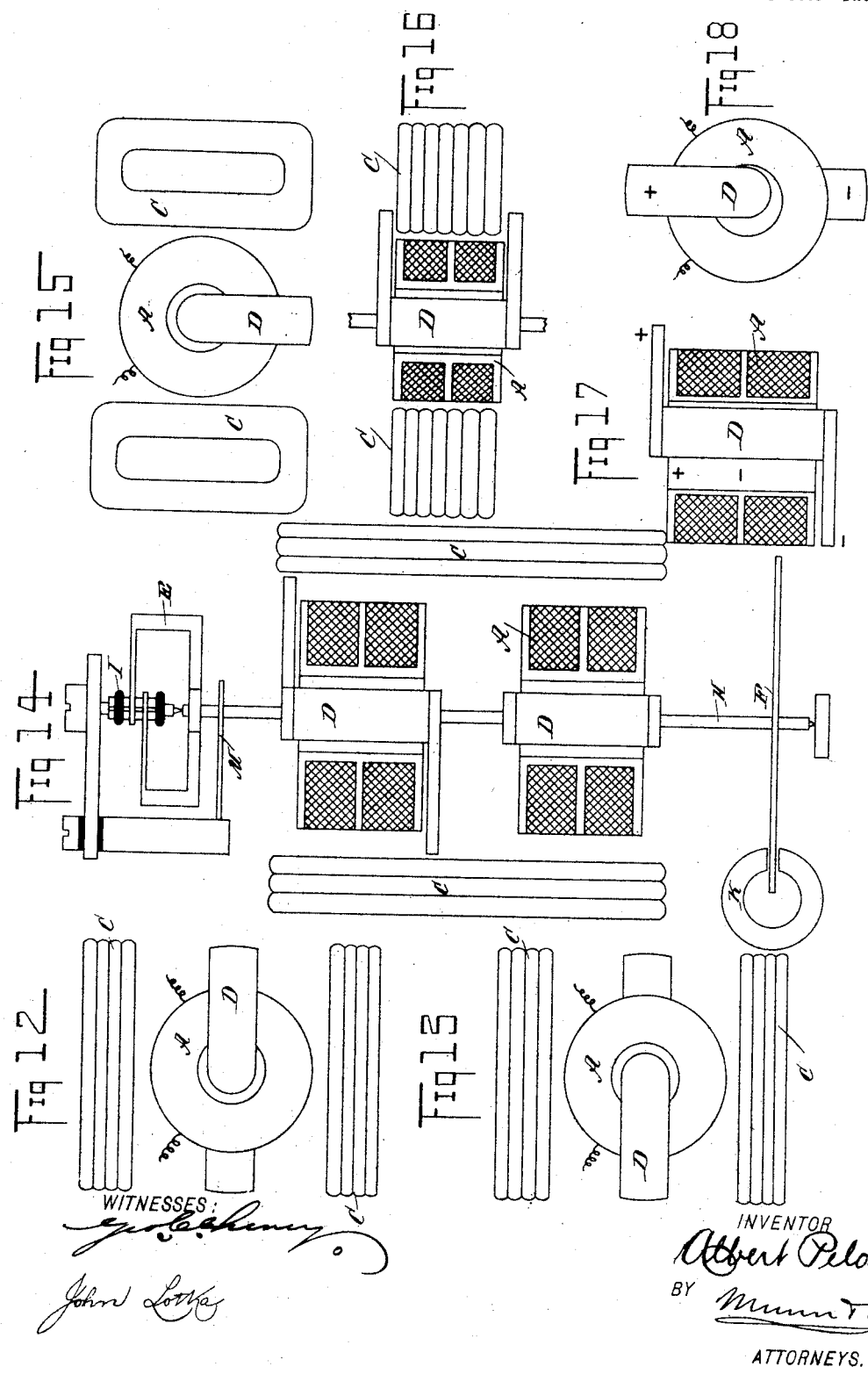

UNITED STATES PATENT OFFICE.

ALBERT PELOUX, OF GENEVA, SWITZERLAND.

ELECTRIC METER.

SPECIFICATION forming part of Letters Patent No. 632,144, dated August 29, 1899.

Application filed December 16, 1898. Serial No. 699,502. (No model.)

*To all whom it may concern:*

Be it known that I, ALBERT PELOUX, a citizen of the Swiss Republic, and a resident of Geneva, in the Swiss Republic, have invented certain new and useful Improvements in Electricity-Meters, of which the following is a full, clear, and exact description.

This invention relates to an electricity-meter of the motor type in which a motor system moves a metallic disk or cylinder. The said disk turning between the poles of permanent magnets or electromagnets acquires a speed of rotation in proportion to the electric energy expended.

The invention will be fully described hereinafter and the features of novelty pointed out in the appended claims.

Reference is to be had to the accompanying drawings, forming a part of this specification, in which similar characters of reference indicate corresponding parts in all the figures.

Figure 1 shows, by way of example, one form of constructing my improved meter. Fig. 2 shows in detail a construction in which the meter comprises several coils adapted to be inserted into the circuit successively. Figs. 3, 4, and 5 are diagrams indicating the passage of the current through said coils. Fig. 6 shows the soft-iron core used in connection with the coils of the meter. Fig. 7 is an elevation of a meter similar to that shown in Fig. 1, but having a larger number of coils. Fig. 8 is an inverted plan of the meter shown in Fig. 7. Figs. 9 and 10 show another form of construction in elevation and plan, respectively. Fig. 11 is a detail sectional elevation of the bearing for the lower end of the meter-spindle. Figs. 12 and 13 are a plan and an inverted plan, respectively, of a further modification. Fig. 14 is an elevation of such modified construction. Figs. 15 and 16 are respectively a plan and an elevation of another modification, and Figs. 17 and 18 show an eccentric arrangement of the core within the coil for a purpose to be stated hereinafter.

As shown in Fig. 1, the meter comprises stationary field-coils C, through which passes the current to be measured, stationary coils A, surrounding the meter-spindles H, and soft-iron cores D on said spindle. The ends of these coils A are connected, respectively, with a section of the stationary collector or commutator I and with one pole of the generator. E is a collector-brush movable with the spindle H, which latter is in contact with a stationary spring M, connected with the other pole of the generator.

As shown in Figs. 2 to 5, each of the coils A consists of four coils $A'$ $A^2$ $A^3$ $A^4$, of which the coils $A'$ $A^4$ are arranged at a right angle to each other, while the other coils occupy intermediate positions. In making a quarter-turn the movable brush E sends the shunt-current successively into each of the coils, as indicated in Figs. 2, 3, 4, and 5, the coils which are shaded being those in the shunt-circuit, the others being inactive. The soft-iron cores D, one of which is shown in Fig. 6, are arranged at right angles to each other and are each placed in the interior of a system of coils A and in such a manner as to be in the magnetic axis of the coil which is momentarily in the shunt-circuit. Upon the spindle H is also fixed a metallic disk F, turning between the poles of fixed magnets K. This mechanism acts as a retarder.

The operation of this meter is as follows: The coil $A'$ in Fig. 2 being in the shunt-circuit acts upon the core D, which is repulsed by the poles of coils C. When this core D has made a sixteenth of a turn, the coil $A^2$ is inserted in the shunt, as shown in Fig. 3, when the coil $A'$ is no longer excited. This coil $A^2$ then acts upon the core D, which continues its rotary motion, and so on for the coils $A^3$ and $A^4$, as shown in Figs. 4 and 5. Then during a quarter-turn the coils of the upper system A are no longer excited. The system of lower coils continues to act for the second quarter-turn. Then it is again the upper system for the third quarter-turn and the lower system for the fourth quarter-turn, the complete revolution thus being accomplished. The core D is thus acted upon by the coils A absolutely as if a single coil A were solid with the core D during a quarter-revolution.

Fig. 7 shows four superposed coils A and all at right angles to the coils C. Each coil A has a movable core D in the center, these cores D being arranged, as seen in Fig. 8, at equal angles to each other. Each of the coils A is traversed by the shunt-current when the core D, placed in its interior, is in the magnetic axis. It will be readily understood by reference to Fig. 8 and the description of Figs. 2 to 5 that a continuous rotary motion is obtained.

Figs. 9 and 10 show a third modification. In this arrangement the magnetic core D is placed in the interior of a coil of thick wire C, connected with the main circuit. The current is not interrupted in this coil. The coils of fine wire A are placed around the coil C and are excited each in its turn by the collector or commutator I and the brush E, so as to produce a rotating magnetic field, this magnetic field causing, as above described, a corresponding continuous rotation of the core D. The form of the core D, as shown in Fig. 9, is different from that shown in Fig. 6—that is, said core consists of a sleeve rigid upon the spindle H and two radial arms extending in opposite directions from the ends of the said sleeves.

Figs. 12, 13, and 14 show another modification, according to which the fixed horizontally-wound coils A are vertically disposed and surround the movable cores D, which have the same shape as in Fig. 9. Each coil A consists of two windings running in opposite directions to each other. The coil being excited, as seen in Fig. 12, produces in the core D a positive pole at one end and a negative pole at the other extremity. These poles are repulsed by the coils C. The piece D takes a rotary movement during a half-revolution, at the end of which the current passes into the winding in the reversed direction, which changes the polarity of the core D, the rotary motion being thus continued for the other half-revolution. In order to overcome the dead-center at the point where the change of polarity takes place, a plurality of similar coil and core systems may be arranged upon the same spindle at different angles, as shown in Fig. 14. Instead of employing two windings running in opposite directions upon the coil A, one winding only may be used, and the direction of the current in the winding may be changed by means of a commutator.

Figs. 15 and 16 show an arrangement similar to that shown in Figs. 12, 13, and 14, except that the coils C are wound horizontally, like the coils A, and the core D has both of its radial arms on the same side.

Figs. 17 and 18 show an arrangement for compensating for the friction. With this object the coil A is placed eccentrically and inclined with relation to the core D, whereby the pole of the coil A will tend to repulse the pole of the core D. This tendency may be regulated by placing the parts A and D more or less eccentric to each other.

Fig. 11 shows an arrangement to prevent the breaking of the stone or jewel Z, supporting the lower end of the spindle H. The pivot R is movable within an end recess of the spindle H, and a spring P tends to press the pivot out of this recess against a flange or rim H' and should be sufficiently strong to carry the weight of the moving part. In case of much pressure being applied the pivot R moves inward in the recess of the spindle H, which sliding down over the pivot comes in contact with the head of the screw T, thus taking the strain off the jewel or step-bearing Z.

My improved meter has the advantage that it dispenses with movable wires upon the armature, which makes an exceedingly strong apparatus, as the movable part only consists of a spindle H, two iron cores D, a disk F, and a movable brush E. The friction may be reduced to a minimum, owing to the fact that the stationary brush M bears on the spindle itself, which may be made of a very small diameter and completely smooth upon its entire surface. The other brush E bears upon the fixed collector or commutator I.

This meter may be employed for a three-wire system or a five-wire system. The fine-wire coils A being stationary, it is possible to wind a great number of layers without augmenting the weight of the movable part, (as is the case with meters in which the movable part comprises an armature wound with fine wire,) in consequence of which it is possible to obtain a very powerful meter, insuring the starting even when very weak currents are being used and diminishing the consumption of current in the fine-wire coils.

It will be understood that the devices shown in Figs. 11, 17, and 18 may be applied to any one of the various constructions shown in the other figures.

Having thus described my invention, I claim as new and desire to secure by Letters Patent—

1. An electricity-meter, comprising stationary field-coils arranged in the measuring-circuit, and stationary shunt-coils consisting of individual sections, a rotary armature comprising pieces of magnetic material energized by the shunt-coils during the rotary motion, and current-switching devices operated by the movement of the armature, for inserting said shunt-coil sections into the circuit successively.

2. An electricity-meter, comprising stationary coils arranged at an angle to each other and adapted to be inserted successively into a shunt-circuit so as to produce a rotating magnetic field, a rotatable core of magnetic material arranged to be acted upon by said magnetic field, a magnetizing-coil wound with thick wire and traversed by the measuring-current, and current-switching devices operated by the movement of said core for inserting the shunt-coils into the circuit.

3. In an electricity-meter, a rotatable core, a coil located eccentrically in relation thereto, and means for producing a rotary magnetic field.

Geneva, Switzerland, November 1, 1898.

ALBERT PELOUX.

In presence of—
 E. F. BARRY,
 BENJ. H. RIDGELY.